(12) United States Patent
Johnson et al.

(10) Patent No.: US 7,050,448 B2
(45) Date of Patent: May 23, 2006

(54) DATA SWITCHING ARBITRATION ARRANGEMENTS

(75) Inventors: Ian David Johnson, Littlehampton (GB); Marek Stephen Piekarski, Macclesfield (GB)

(73) Assignee: Xyratex Technology Limited, Hampshire (GB)

( * ) Notice: Subject to any disclaimer, the term of this patent is extended or adjusted under 35 U.S.C. 154(b) by 783 days.

(21) Appl. No.: 09/826,801

(22) Filed: Apr. 5, 2001

(65) Prior Publication Data

US 2001/0028659 A1    Oct. 11, 2001

(30) Foreign Application Priority Data

Apr. 5, 2000    (GB)    .................................... 0008195

(51) Int. Cl.
*H04L 12/28*    (2006.01)
*H04L 12/56*    (2006.01)

(52) U.S. Cl. ...................... 370/413; 370/412; 370/230; 370/395.72

(58) Field of Classification Search ................ 370/230, 370/398, 416, 395.72, 412, 380, 413, 370–389; 340/2.23, 325.5; 709/249
See application file for complete search history.

(56) References Cited

U.S. PATENT DOCUMENTS

| | | | | |
|---|---|---|---|---|
| 5,267,235 A | | 11/1993 | Thacker | ........................ 370/60 |
| 5,500,858 A | * | 3/1996 | McKeown | ................... 370/412 |
| 5,541,916 A | | 7/1996 | Nobuyuki | ................... 370/60.1 |
| 5,544,332 A | * | 8/1996 | Chen | .......................... 710/108 |
| 6,044,061 A | | 3/2000 | Aybay et al. | ............... 370/230 |
| 6,625,121 B1 | * | 9/2003 | Lau et al. | ................... 370/230 |
| 6,810,426 B1 | * | 10/2004 | Mysore et al. | ............. 709/234 |
| 6,922,391 B1 | * | 7/2005 | King et al. | .................. 370/229 |

FOREIGN PATENT DOCUMENTS

| | | |
|---|---|---|
| EP | 0623880 | 11/1994 |
| WO | 0038375 | 8/1997 |
| WO | 9911033 | 3/1999 |
| WO | 9731463 | 1/2000 |

* cited by examiner

*Primary Examiner*—Wellington Chin
*Assistant Examiner*—Chuong Ho
(74) *Attorney, Agent, or Firm*—Pillsbury Winthrop Shaw Pittman LLP

(57) ABSTRACT

There is disclosed a masking unit (REQMSK) for use in a data packet switching system. The data switching system being of the type having a memoryless cross-back switch (SM) providing cyclic connections under the control of a switch arbiter (SCARB) between ingress routers (IR0, IR1, IR2 and IR3) and egress routers (ER0, ER1, ER2 and ER3). Each of the ingress routers (IR0–IR3) is provided with incoming packet buffering on a virtual output queue basis (VOQ0.0, VOQ0.1, VOQ0.2, and VOQ0.3 for ingress router IR0). Each virtual output queue also produces a connection request signal REQ0.0 to REQ3.3 when the corresponding queue has a data packet in it. The masking unit REQMSK is arranged to randomly mask out correlated connection requests.

6 Claims, 3 Drawing Sheets

DATA SWITCHING ARBITRATION ARRANGEMENTS

Figure 1:
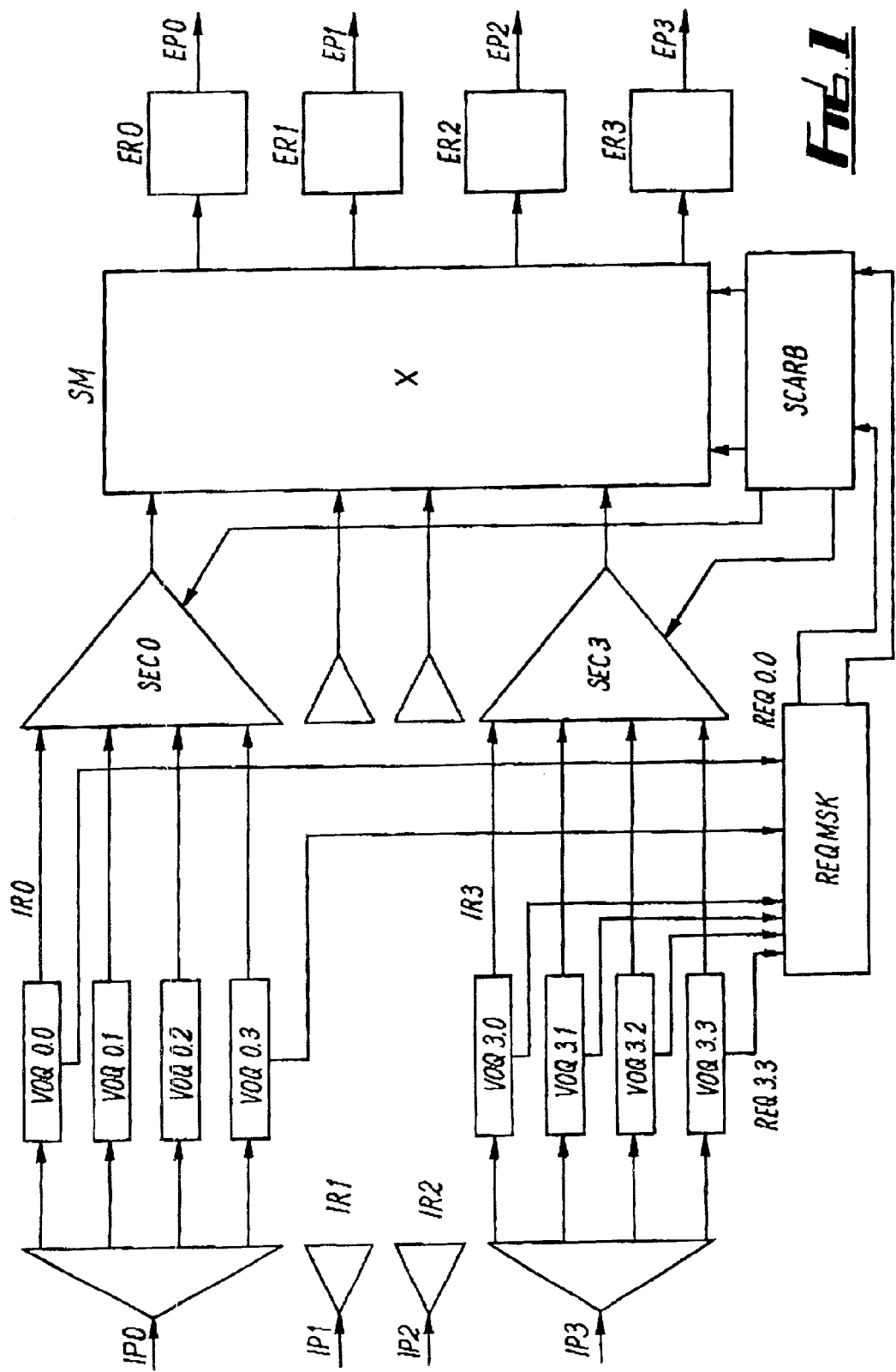

The present invention relates to data switching systems and is more particularly concerned with switch connection request arbitration arrangements for providing traffic flow control management for such systems.

In a data switching system of the type disclosed in PCT/GB99/03748 a central memoryless cross-bar type switch provides connections on a cyclic basis between ingress and egress routers. The ingress routers provide buffering for incoming data packets on a virtual output queue basis. Unless the data switching system connection arbitration arrangements for selecting the connections across the switch are controlled on a fair basis, severe congestion at the ingress virtual output queues can occur. For example, in a simple four ingress four egress router system if a traffic pattern occurs where the four ingress routers require connection to the same egress router for say 33% of the traffic cycle with the rest of their offered load distributed across the remaining egress routers, it can be shown that, without bandwidth allocation arrangements, all of the virtual output queues for that egress router will fill rapidly with an offered load of greater than 80% since the egress router is oversubscribed.

It is an object of the present invention to provide a connection request control mechanism that overcomes the above mentioned problem.

According to the invention there is provided a masking unit, for use in a data packet switching system of the type having a memoryless cross-bar type switch providing cyclic connections between ingress routers and egress routers, the ingress routers providing incoming packet buffering on an virtual output queue basis and generating switch connection requests when a virtual output queue contains a data packet, characterised in that the masking unit receives all the switch connection requests and is arranged to randomly mask connection requests.

Each connection request is typically accompanied by a four-bit weight value. The weight value is set by the system parameters which defines a quality of service rating for the request. The quality of service rating may reflect the priority level of the virtual output queue and may be derived from the urgency required for the data packet to be switched through the system, the number of packet cycles elapsed since the buffer was served and the size of the buffer queue for example.

According to a feature of the invention the masking unit includes a comparator for each connection request and the comparator is fed with the weight of the request and a randomly generated bit stream, the comparator producing a random bit stream whose proportion of 1's to 0's is determined by the weighting factor of the request and the random bit stream is used for masking out the request.

According to a further feature of the invention the masking unit includes a two input AND gate for each request to which is connected on one input the connection request and on the other input the output of the comparator.

According to a further feature of the invention there is provided an arrangement for generating a uncorrelated set of randomly generated bit streams comprising a single random bit stream generator clocked at frequency f and fed into the first stage of a shift register which is n bits wide, where n equals the number of bits of the weighting factor of the requests, and x+1 stages deep, where x equals the maximum number of connections that the cross-bar switch can make and the shift register is clocked at a frequency for f/n to produce at each of the stages bar the first an uncorrelated set of bit streams for application to the comparators of the masking unit.

Figure 2:
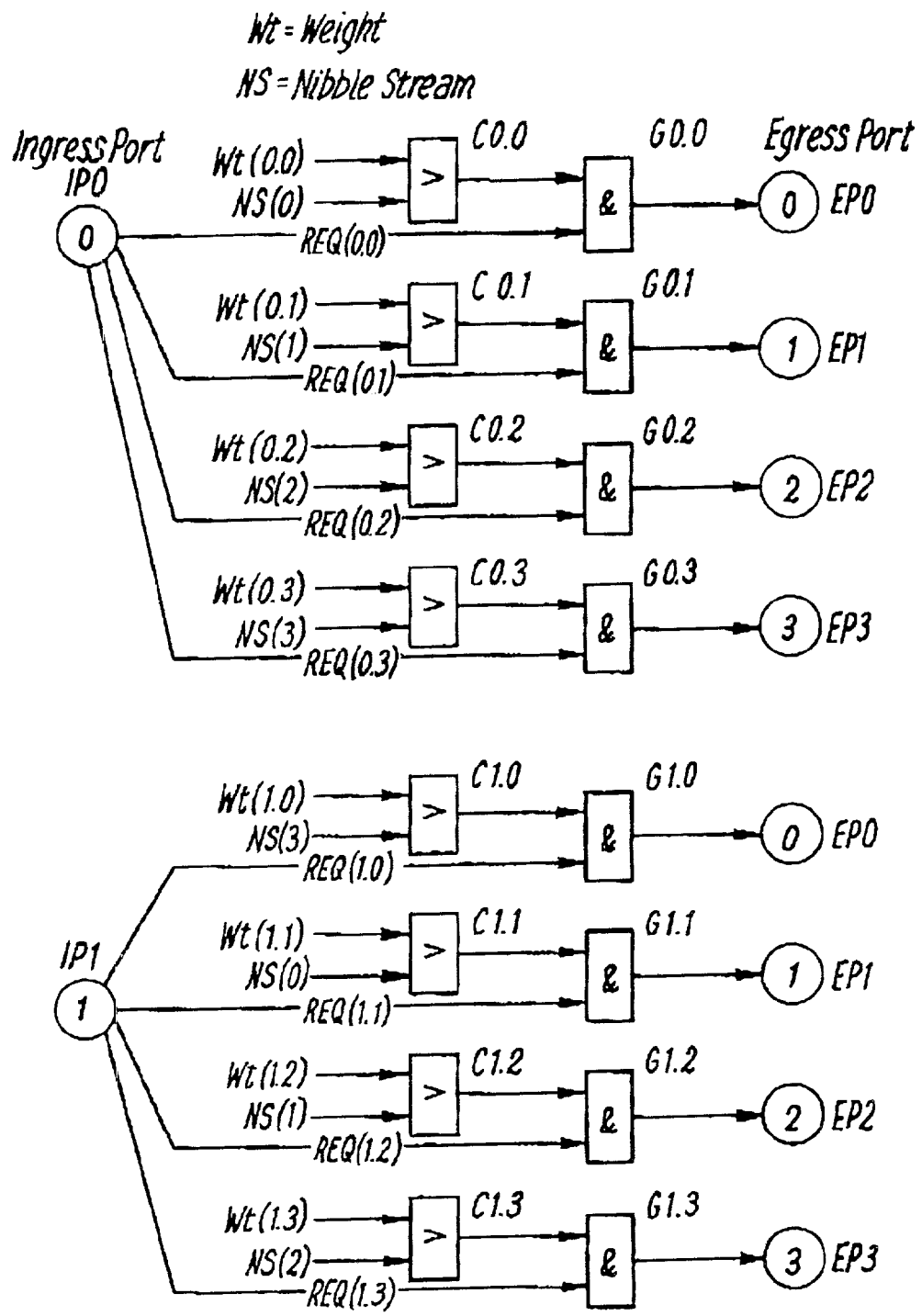
Figure 3:
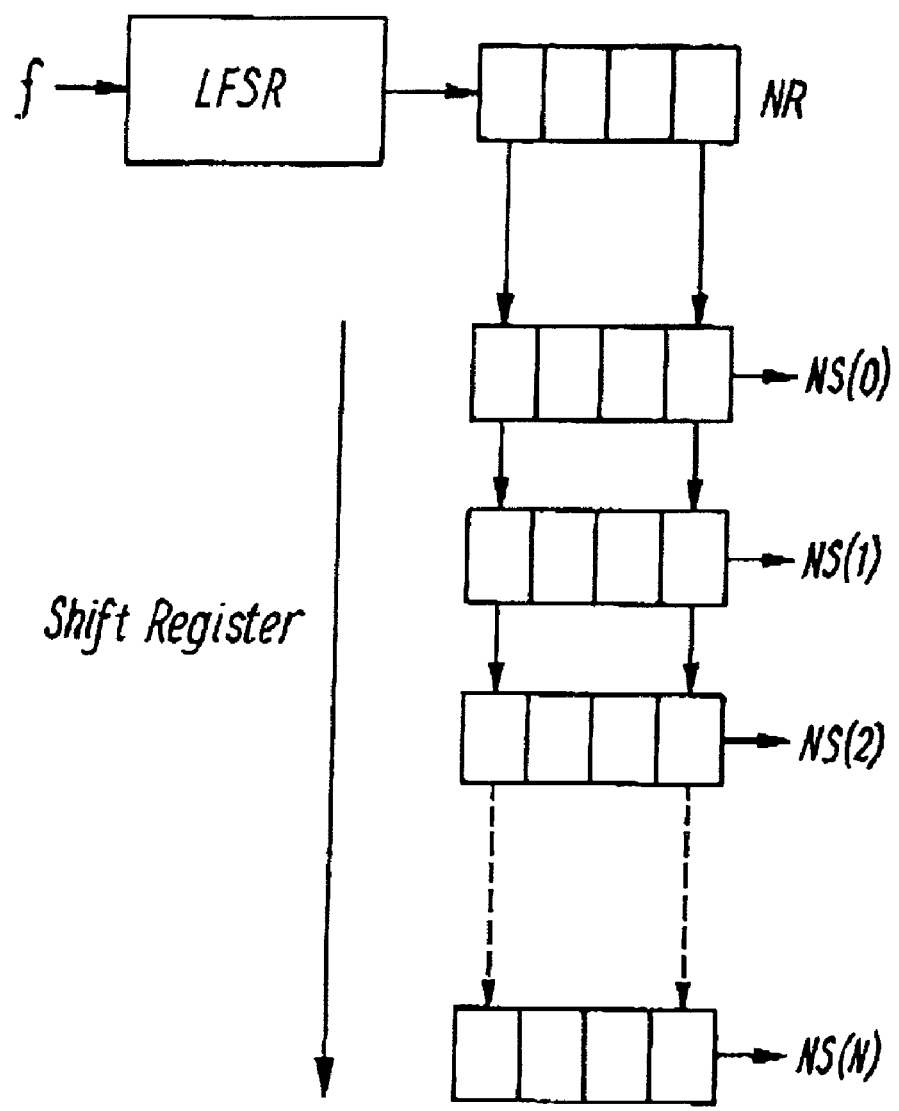

The invention together with its various features will be more readily understood from the following description which should be read in conjunction with the accompanying drawings. Of the drawings:

FIG. 1 shows in block diagram form a data packet switching system according to the invention, FIG. 2 shows in abbreviated form the masking unit of the invention whereas, FIG. 3 shows the circuit arrangement for generating nibble streams for use in FIG. 2 and for generating uncorrelated masking of requests.

The basic architecture of a high speed data packet switching system using a memoryless space division (cross-bar) type switching matrix SM is shown in FIG. 1. The switching system is shown for simplicity of presentation as a four ingress, four egress router arrangement. The ingress routers, of which only ingress routers IR0 and IR3 are shown in any detail, provide so-called virtual output buffering for ports IP0 to IP3 which are connected as required by a N×N (i.e. four by four) switching matrix SM which serves four egress routers ER0 to ER3 attached to four egress ports EP0 to EP3. Each ingress router includes virtual output queue buffers, such as VOQ0.0 to VOQ0.3 for ingress port IP0. Considering ingress router IR0 for ingress port IP0, buffer VOQ0.0 is the virtual output queue for egress router ER0, VOQ0.1 for egress router ER1, VOQ0.2 for egress router ER2 and VOQ0.3 for egress router ER3. Similarly ingress port IP3 is provided with four virtual output queues VOQ3.0 to VOQ3.3 on a similar basis. The switching matrix SM is controlled by a switch control arbitrator SCARB which analyses packet transfer requests REQ0.0 to REQ3.3 and determines for each switching matrix cycle the connections to be made from ingress port to egress port and, therefore, the virtual output queues to be involved in these connections. The switch control arbiter SCARB also selects the virtual output queue within an ingress router to be used in a connection by a activating an output selector SEC0–SEC3.

The connection requests generated by the ingress ports, such as REQ0.0 for ingress port IP1 virtual output queue VOQ0.0, identify those virtual output queues that are storing packets of data and these are applied to a request mask arrangement REQMSK. For ease of presentation for example only the connection request paths from virtual output queues VOQ0.0 and VOQ0.3 for ingress router IR0 are shown in the drawing. It will be appreciated by those skilled in the art that each virtual output queue in each of the ingress routers has an individual connection request path to the request mask arrangement REQMSK. The request mask arrangement REQMSK will receive a request lead from each virtual output queue from each of the ingress routers (IR0–IR3) making, in the four ingress router/four egress router system of FIG. 1, a total of sixteen request lines REQ0.0 to REQ3.3.

The request mask arrangement REQMSK is introduced to solve the problem created by the switch control arbitrator SCARB when traffic conditions are such that congestion occurs at specific ingress port virtual output queues.

The solution to the congestion problem, provided by the request masking arrangement REQMSK, is to create a bandwidth allocation mechanism that allows the egress bandwidth to be randomly preferentially allocated to the data stream emanating from a port so that it appears unimpeded by the data streams emanating from the remaining ports. The implementation of the bandwidth allocation mechanism provided by the request masking arrangement REQMSK is based upon pseudo random probabilistic masking. That is any particular connection which has its bandwidth restricted to say 33% will have its request randomly masked from the switch control arbitrator SCARB 67% of the time.

The request masking arrangement is shown in FIG. 2 for two ingress port connection requests only (i.e. ingress port 0 and ingress port 1) for ease of presentation. Each virtual output queue request, such as REQ0.0, is applied to a two input AND gate such as G0.0 whose other input is fed from a comparator, such as C0.0. The comparator is used to provide a pseudo random bit stream whose proportion of 1's to 0's is determined by a randomly generated weight value, called a nibble stream ns, compared with the weighting factor for the request. Each connection request is typically accompanied by a four bit weight factor value, such as Wt (0.0) for request REQ0.0. The weight factor value is set by the system parameters to define the quality of service rating for the request (i.e. the virtual output queue). The quality of service rating may reflect the type of traffic handled by the egress port, the priority level of the egress port as well as the occupancy of the virtual output queue. The weighting factor value may be adjusted dynamically by the data switching system administration control and the implications of the weight factor value are outside the scope of this invention.

The randomly generated weight value is shown in FIG. 2 as NS(0) for example and FIG. 3 shows how the so called nibble streams are generated.

It is important to ensure that there is no interaction between the masking of any pair of connections (i.e. the "random" masking of requests must be uncorrelated in any pair of related connections). Related connections are defined by having either a common source or a common destination port. For example, when two ingress ports have 100% of their offered load for the same egress port, if the masking bit streams become correlated (i.e. both requests are masked out), there will be a period where no connections are made and there is a waste of possible bandwidth. In addition correlation between bit streams can also lead to unfairness caused by the sequences that the requests are presented to the switch control arbiter SCARB. To overcome this effect the sixteen possible requests in a four port system are divided into 4 sets of unrelated connections and each of the sets is defined by a skew factor K where K is equal to the destination port address minus the source port address. When K=0 ingress port 0 can be connected to egress port 0, ingress port 1 to egress port 1, ingress port 2 to egress port 2 and ingress port 3 to egress port 3, whereas, when K=1. ingress port 0 can be connected to egress port 1, ingress port 1 to egress port 2, ingress port 2 to egress port 3 and ingress port 1 to egress port 0. Similarly when K=2, ingress port 0 can be connected to egress port 2, ingress port 1 to egress port 3, ingress port 2 to egress port 0 and ingress port 3 to egress port 1 whereas when K=3, ingress port 0 can be connected to egress port 3, ingress port 1 to egress port 0, ingress port 2 to egress port 1 and ingress port 3 to egress port 2. With such an arrangement the problem of generating multiple uncorrelated bit-streams is reduced to generating one bit-stream per port (or skew factor) instead of one per connection. Rather than generating the set of bit streams for each skew factor, it is more efficient to generate a set of uncorrelated nibble streams and then generate the masking bit streams for each skew factor.

The nibble stream generator is shown in FIG. 3. The nibble stream generator consists of a linear feed back shift register LFSR which generates a single pseudo-random bit-stream which is fed into an n bit wide nibble register NR at a frequency of f. Typically the frequency f will be the frequency of the clock cycle for the switching matrix SM multiplied by n. The n bit wide nibble in register NR is then shifted in parallel at a frequency f/n (i.e. the clock cycle frequency of the switching matrix SM) through a set of n-bit wide shift register stages NSR(0)–NSR(N) depending upon the number of cross-bar switch ports (i.e. four in the example chosen for the specific description). The linear feed back shift register LFSR is clocked n times faster than the nibble shift register to ensure that successive nibbles are uncorrelated, where n is the width of the nibble (i.e. the number of bits in an weight value). The output from the nibble generator on leads NS(0), NS(1), NS(2) and NS(3) provides a random uncorrelated four bit weight for each skew factor. The randomly generated weighted nibble streams are applied to the comparators C0.0 etc. in the request masking arrangement of FIG. 2. It will be noted that the effect of the skew factor is achieved by slipping the nibble streams in the same manner as that discussed for the uncorrelated requests so that for ingress port IP0 nibble stream NS(0) is applied to comparator C0.0 but to comparator C1.1 for ingress port IP1 and accordingly for nibble streams NS(2) and NS(3) as well as for ingress ports IP2 and IP3.

The invention has been described with reference to a simplified 4×4 ingress/egress router with weighted requests using a four bit weight value and it will be appreciated by those skilled in the art that the arrangements described can be adapted to accommodate more than four ingress/egress router arrangements and to use weight values requiring more or less bits.

The invention claimed is:

1. A masking unit for use in a data packet switching system of the type having a memoryless cross-bar switch providing cyclic connections between ingress routers and egress routers, the ingress routers providing incoming packet buffering on a virtual output queue and being arranged to generate switch connection requests when a virtual output queue contains a data packet, characterised in that the masking unit is arranged to receive all of the switch connection requests and to randomly mask connection requests and wherein the masking unit includes a comparator for each virtual output queue, the masking unit is arranged to receive with each request an associated weight value, and to feed the weight values to the corresponding comparators together with a stream of randomly generated values, the comparators being arranged to produce respective random bit streams whose proportion of 1's to 0's is determined by the corresponding weight values, and the masking unit being arranged to use each random bit stream for masking out the requests from the corresponding virtual output queue.

2. A masking unit as claimed in claim 1 further comprising a two input AND gate for each comparator, one input of the AND gate being arranged to receive the corresponding connection requests and the other input of the AND gate being arranged to receive the output of the corresponding comparator.

3. A masking unit as claimed in claim 1 including an arrangement for generating an uncorrelated set of randomly generated bit streams, the arrangement comprising a single random bit stream generator clocked at frequency f and fed into the first stage of a shift register which is n bits wide, where n equals the number of bits of the weighting factor of the requests, and x+1 stages deep, where x equals the number of connections that the memoryless cross-bar switch can make, the shift register being clocked at a frequency f/n to produce at each of the stages bar the first an uncorrelated set of n bit nibble streams for application to the comparators of the masking unit.

4. A masking unit as claimed in claim 3 in which the frequency f/n is equal to the frequency of the cyclic operation of the memoryless cross-bar switch.

5. A masking unit as claimed in claim 3 in which the random bit stream generator is a linear feed back register.

6. A method of controlling a data packet switching system of the type having a memoryless cross-bar switch providing cyclic connections between ingress routers and egress routers under the control of a switch control arbiter, the ingress routers providing incoming packet buffering on a virtual output queue basis and being arranged to generate switch correction requests when a virtual output queue contains a data packet, the method being characterized by comprising:

randomly selecting ones of said switch connection requests; and transmitting all the connection requests except said selected requests to the switch control arbiter, wherein each request is associated with a weight value, the selection of the requests including comparing the associated weight value with a first randomly generated value to generate a second random value and selecting the requests based on the second random value.

\* \* \* \* \*